United States Patent
Lapassat

(10) Patent No.: US 10,630,203 B2
(45) Date of Patent: Apr. 21, 2020

(54) BIDIRECTIONAL POWER CONVERSION SYSTEM FOR SINGLE-PHASE ELECTRIC LOAD AND CORRESPONDING POWER CONVERSION PROCESS

(71) Applicant: GE ENERGY POWER CONVERSION TECHNOLOGY LIMITED, Warwickshire (GB)

(72) Inventor: Nicolas Lapassat, Villebon sur Yvette (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 43 days.

(21) Appl. No.: 15/771,562

(22) PCT Filed: Oct. 25, 2016

(86) PCT No.: PCT/EP2016/075685
§ 371 (c)(1),
(2) Date: Aug. 27, 2018

(87) PCT Pub. No.: WO2017/072116
PCT Pub. Date: May 4, 2017

(65) Prior Publication Data
US 2018/0367061 A1    Dec. 20, 2018

(30) Foreign Application Priority Data

Oct. 28, 2015  (EP) ..................... 15306722

(51) Int. Cl.
*H02M 7/493*    (2007.01)
*H02M 1/12*     (2006.01)
(Continued)

(52) U.S. Cl.
CPC .............. *H02M 7/493* (2013.01); *H02M 1/12* (2013.01); *H02M 7/53871* (2013.01); *H02M 3/00* (2013.01); *H02M 2001/0064* (2013.01)

(58) Field of Classification Search
CPC .... H02M 7/493; H02M 7/53871; H02M 1/12; H02M 2001/0064; H02M 7/49;
(Continued)

(56) References Cited

U.S. PATENT DOCUMENTS

| 4,206,844 A | 6/1980 | Thukamoto et al. |
| 5,355,294 A | 10/1994 | De Doncker et al. |

(Continued)

FOREIGN PATENT DOCUMENTS

| GB | 2 219 084 A | 11/1989 |
| WO | 01/10471 A1 | 2/2001 |
| WO | 02/17469 A1 | 2/2002 |

OTHER PUBLICATIONS

Extended European Search Report and Opinion issued in connection with corresponding EP Application No. 15306722.8 dated May 27, 2016 (English Translation not available).
(Continued)

*Primary Examiner* — Gary L Laxton
*Assistant Examiner* — Ivan Laboy
(74) *Attorney, Agent, or Firm* — Wood IP LLC

(57) ABSTRACT

This bidirectional power conversion system for a single-phase electric load is intended to be connected to a continuous supply bus delivering a single supply voltage and deliver to the load an alternating output voltage substantially in a cradle form. It includes a set of intertwined converters able to jointly deliver a control voltage whose phase shift of its fundamental component with respect to the output voltage is intended to control the transfer of power between converters and the load, said converters being controlled in such a way
(Continued)

that the amplitude of the average value of the control voltage corresponds to the amplitude of the alternating output voltage and in such a way that said control voltage has amplitudes capable of reducing the fluctuations of a current flowing between the voltage converters and the load.

17 Claims, 9 Drawing Sheets

(51) Int. Cl.
    *H02M 7/5387*      (2007.01)
    *H02M 1/00*      (2006.01)
    *H02M 3/00*      (2006.01)

(58) Field of Classification Search
    CPC ....... H02M 7/5387; H02M 2001/0067; H02M 2001/0077; H02M 2001/00873; H02M 3/1584; H02M 3/285; H02M 2003/1586
    USPC .................................................. 363/71–72
    See application file for complete search history.

(56) References Cited

U.S. PATENT DOCUMENTS

| | | | | |
|---|---|---|---|---|
| 6,101,109 A * | 8/2000 | Duba | ............ | H02M 7/49 363/41 |
| 2005/0278012 A1 | 12/2005 | Vonderwalde | | |
| 2008/0074911 A1 * | 3/2008 | Petter | ............ | H02M 1/14 363/65 |
| 2009/0116266 A1 * | 5/2009 | Lai | ............ | H02M 7/493 363/40 |
| 2010/0109582 A1 * | 5/2010 | Terode | ............ | H02M 7/49 318/400.2 |
| 2010/0165678 A1 | 7/2010 | Costan et al. | | |
| 2011/0158917 A1 | 6/2011 | MacDonald et al. | | |
| 2015/0062984 A1 * | 3/2015 | Hu | ............ | H02M 1/12 363/71 |
| 2015/0270789 A1 | 9/2015 | Shi et al. | | |

OTHER PUBLICATIONS

International Search Report and Written Opinion issued in connection with corresponding PCT Application No. PCT/EP2017/054587 dated May 18, 2017.

Office Action issued in connection with corresponding EP Application No. 15306722.8 dated Dec. 18, 2018.

Office Action issued in connection with corresponding EP Application No. 15306722.8 dated Apr. 10, 2018.

Office Action issued in connection with corresponding EP Application No. 15306722.8 dated Aug. 23, 2018.

Szabados et al. "Peak Power Bi-directional Transfer From High Speed Flywheel to Electrical Regulated Bus Voltage System: A Practical Proposal for Vehicular Technology" IEEE Transactions on Energy Conversion, vol. 13, No. 1, pp. 34-41, 1998.

Goncalves De Oliveira "Power Control Systems in a Flywheel based All-Electric Driveline", Uppsala University, Digital Comprehensive Summaries of Uppsala Dissertations from the Faculty of Science and Technology, ISSN 1651-6214; 2011 pp. 102.

* cited by examiner

BIDIRECTIONAL POWER CONVERSION SYSTEM FOR SINGLE-PHASE ELECTRIC LOAD AND CORRESPONDING POWER CONVERSION PROCESS

FIELD OF THE INVENTION

The invention herein generally concerns power converters and relates in particular to a bidirectional power conversion system for a single-phase electric load.

More particularly, this invention relates to a power conversion system intended to be connected to a direct current bus and designed to deliver an alternating power to a single-phase load while maintaining a high frequency voltage regulation, i.e. a frequency of at least 1000 Hertz or, in general, at a frequency of at least one third of the pulse frequency of the power conversion system.

It means in particular to deliver to a single-phase load a high frequency alternating voltage, where the ratio between the voltage and the frequency is constant, ensuring a bidirectional power transfer for powers above 500 kW.

The alternating voltage here is a voltage substantially in a cradle form. It can be with a trapezoidal voltage or in a cradle form, with transitions centered at 0V.

The power conversion system can be a power converter for example for an electric machine, such as an electric energy storage device, or a DC/DC converter, such as a DAB converter ("Dual active Bridge").

BACKGROUND

In this respect, refer to the document U.S. Pat. No. 5,355,294, which describes a DAB type conversion system, comprising an input rectifier connected to a power bus in which an alternating current flows, a DC/DC converter input delivering a first voltage level and a converter output providing a second voltage level and connected to the input converter by a transformer.

Such a system is intended to deliver in a cradle form two alternative voltages that are out of step with the other.

According to an application, this type of conversion system can be used to control the direction of the power transfer between the converter and a load based on the phase shift between the two voltages.

However, this type of conversion system requires using two converters, namely the input converter and the output converter. However, converters have a relatively large footprint which causes constraints on the use of this type of converter. In addition, the presence of two converters makes the power conversion system relatively expensive.

Also refer to document EP-A-2 006 993 that describes a bidirectional converter with H-bridge including several redundant bridges and in which each bridge can operate at different supply bus voltages to maximize the power output. During the normal operation of the converter, a voltage at seven different voltage levels is provided at the converter output in order to simulate a sinusoidal output voltage.

When a bridge is broken, the other bridges work in a three phase manner, providing output at five voltage levels.

On the other hand, document U.S. Pat. No. 6,005,788 describes a multilevel power converter for high voltage and high power applications including several inverters connected in series and with dedicated DC supply buses to provide multilevel waveforms. This converter thus requires the provision of many power buses.

Document U.S. Pat. No. 3,581,212 describes a quick response power conversion circuit including several inverters, each having two opposed output levels connected in series or in parallel and selectively controlled to produce a composite output.

When using voltages in an out of phase in a cradle form, as in the DAB converters, voltage levels must be kept at a nominal voltage level, close to the transformation ratio. If not, fluctuations appear in the current supplied to the load. Such fluctuations can be very large if the voltage difference becomes large.

FIGS. 1A, 1B, 1C and 1D illustrate the evolution of the current flowing between the load and the converter (curve I), the converter output voltage (curve II) and the load voltage (curve III), in case of low voltage difference (FIGS. 1A and 1B) and in case of high voltage difference (FIGS. 1C and 1D) both during a power transfer from the converter to the load (FIGS. 1A and 1C) and during a power transfer from the load to the converter (FIGS. 1B and 1D).

As seen on FIGS. 1$a$ and 1$b$, a current fluctuation (curve I) appears even in case of low voltage difference between the voltage delivered by the converter (curve II) and the load voltage (curve III). These voltage fluctuations can be large when the difference in voltage increases (FIGS. 1C and 1D).

For applications embedded on board motor vehicles with at least partially electric traction, in which a two-way power transfer is implemented between the vehicle traction batteries and an inertia wheel, the power fluctuations are eliminated by using a bidirectional chopper placed between conversion stages. However, this chopper also constitutes an extra conversion stage that increases the volume and cost of the power conversion system. In addition, the chopper switching elements should be sized according to the maximum value of the current.

SUMMARY

The purpose of the invention is therefore to offset the aforementioned disadvantages and to propose a power conversion system that avoids the appearance of current fluctuations and this, without the need for an additional converter.

The purpose of this invention is therefore a bidirectional power conversion system for a single-phase electric load, said conversion system being intended to be connected to a continuous supply bus, delivering a single continuous supply voltage and delivering to the load an alternating output voltage significantly shaped like a cradle and including a set of intertwined converters able to jointly deliver a control voltage whose phase shift of its basic component with respect to the output voltage is intended to control the transfer of power between the converters and the load, said converters being controlled in such a way that the average amplitude value of the control voltage cradle form corresponds to the alternating output voltage amplitude and that said control voltage has amplitudes likely to reduce the current fluctuations in the current flowing between the voltage converter and the load.

In a form of embodiment, each converter includes an H-bridge able to deliver three voltage levels.

According to another system feature according to the invention, it includes a converter control circuit able to deliver to each converter a common reference voltage in a cradle form corresponding to the alternating output voltage and a set of out of phase sawtooth control signals destined respectively to the converters, each converter delivering an output voltage based on the reference voltage and a control signal.

In an embodiment, the converters have inductive circuits to connect the converters.

In a form of embodiment, these inductive circuits each include a set of paired coils with a first coil connected comprising a first converter and a second coil connected to another converter, the coils being wrapped in reverse direction around one magnetic core so that the magnetic fluxes generated by the coils cancel each other when the converter currents are equal.

In a form of embodiment, the inductive circuits include, for each converter, two sets of matched coils, each including a first coil connected to two converters and a second coil connected so that the second coil of the first set of coils is connected to the second coil of the first set of coils of all converters, an output transformer being connected to the first and second sets of coils to raise said alternating voltage.

As a variant, the inductive circuits include, for each converter, two sets of paired coils, each including a first coil connected to said converter and a second coil connected so that the second coils are connected in pairs, an output transformer being connected to the first coil of said first and second sets of coils to provide said alternating voltage.

For example, the paired sets of coils are wound on separate cores.

Alternatively, these coils can be coiled on a common core with a third free flow column allowing a free flow of the magnetic flow.

According to still another variant, the inductive circuits include, for each converter, a first coil connected to said converter, and a second coil connected to a second coil of an inductive circuit of another converter, said load being directly connected to said inductive circuits.

The purpose of the invention is also, according to another aspect, a bidirectional power conversion process between a single-phase electric load and a continuous supply bus delivering a single supply voltage, in which an alternating output voltage substantially in a cradle form is delivered to the load and a control voltage is developed, whose phase shift from its fundamental component with respect to the output voltage, controls the power transfer through a set of interlaced converters.

The converters are controlled in such a way that the average value of the amplitude of the control voltage cradle form corresponds to the amplitude of the alternating output voltage and so that such control voltage has amplitudes likely to reduce the current fluctuations in the current flowing between the voltage converter and the load.

BRIEF DESCRIPTION OF THE DRAWINGS

Other purposes, characteristics and advantages of the invention will appear at the reading of the following description, given only by way of a non-limiting example, and made in reference to the attached drawings on which.

DETAILED DESCRIPTION

Figure 1A:
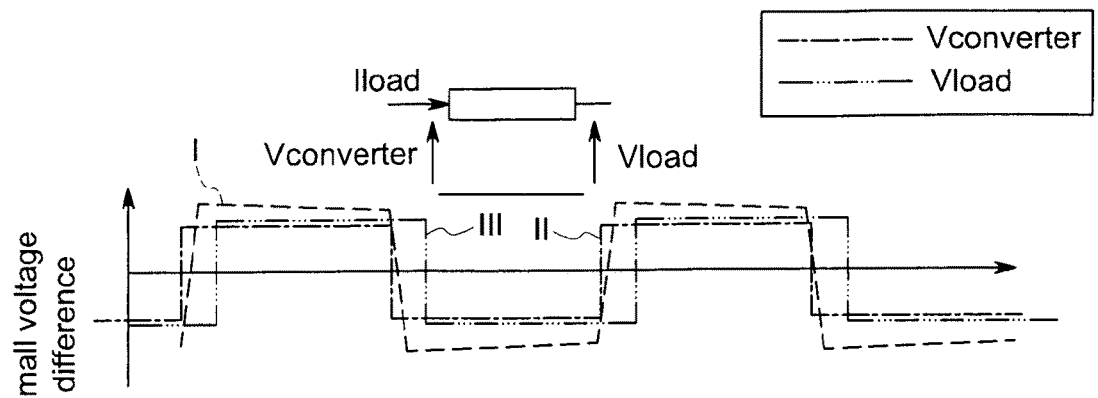
FIGS. 1A, 1B, 1C and 1D, which have already been mentioned, illustrate the problems due to the appearance of current fluctuations in case of a voltage difference between the output of the converter and the load.
Figure 1B:
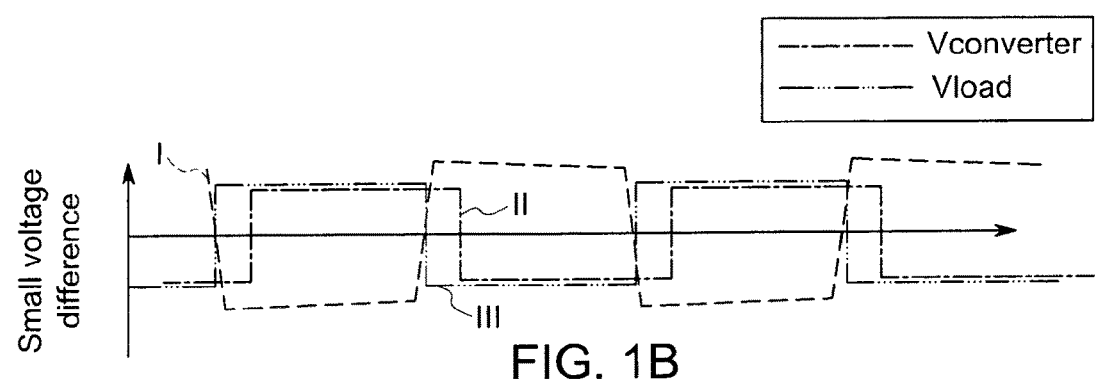
Figure 1C:
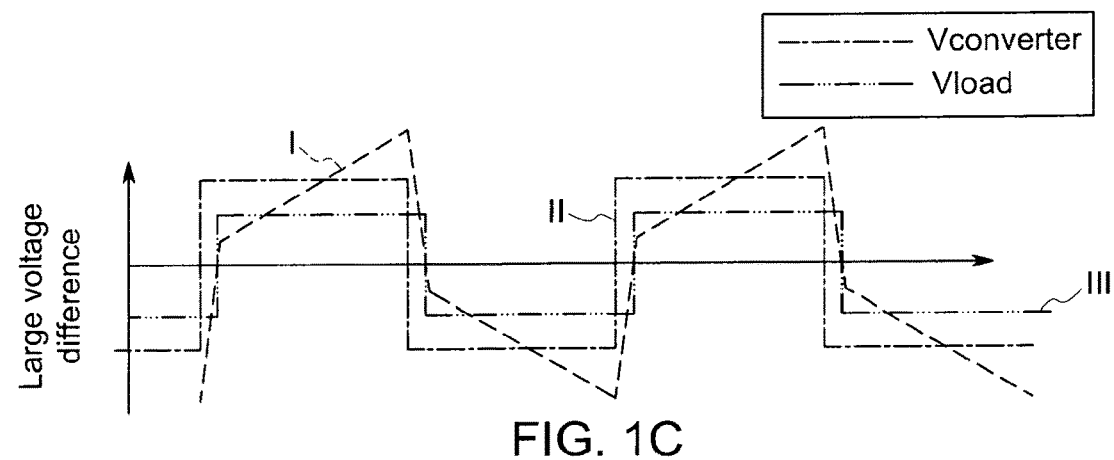
Figure 1D:
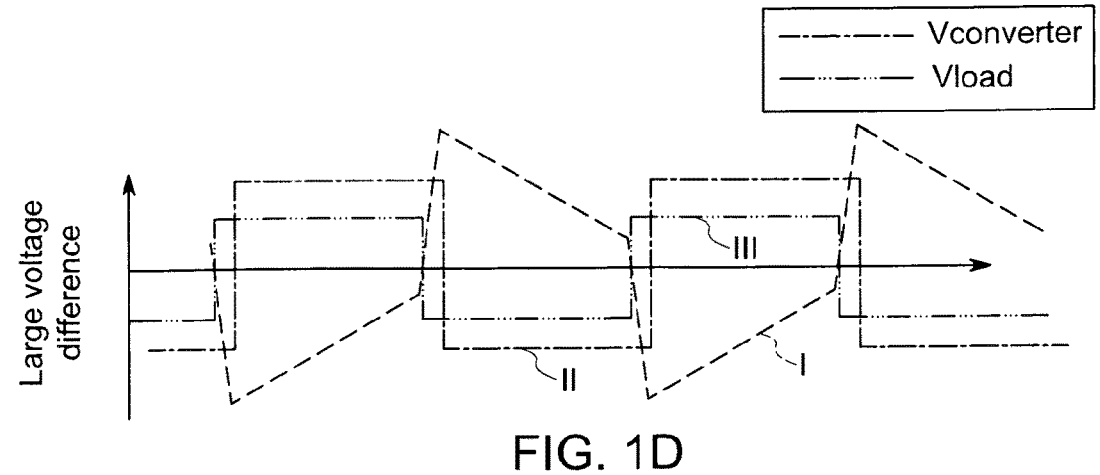
Figure 2:
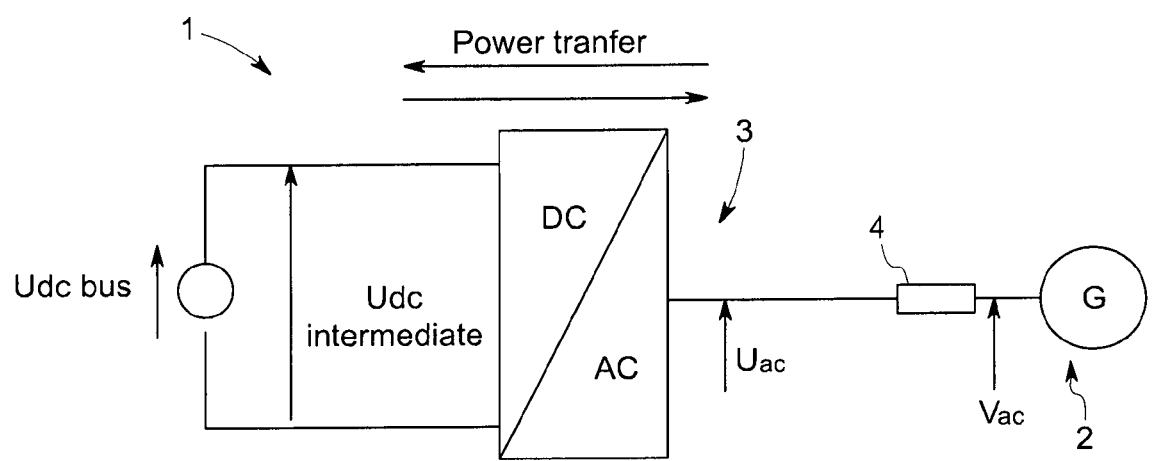
FIG. 2 shows the general architecture of a power conversion system in accordance with the invention.
Figure 3A:
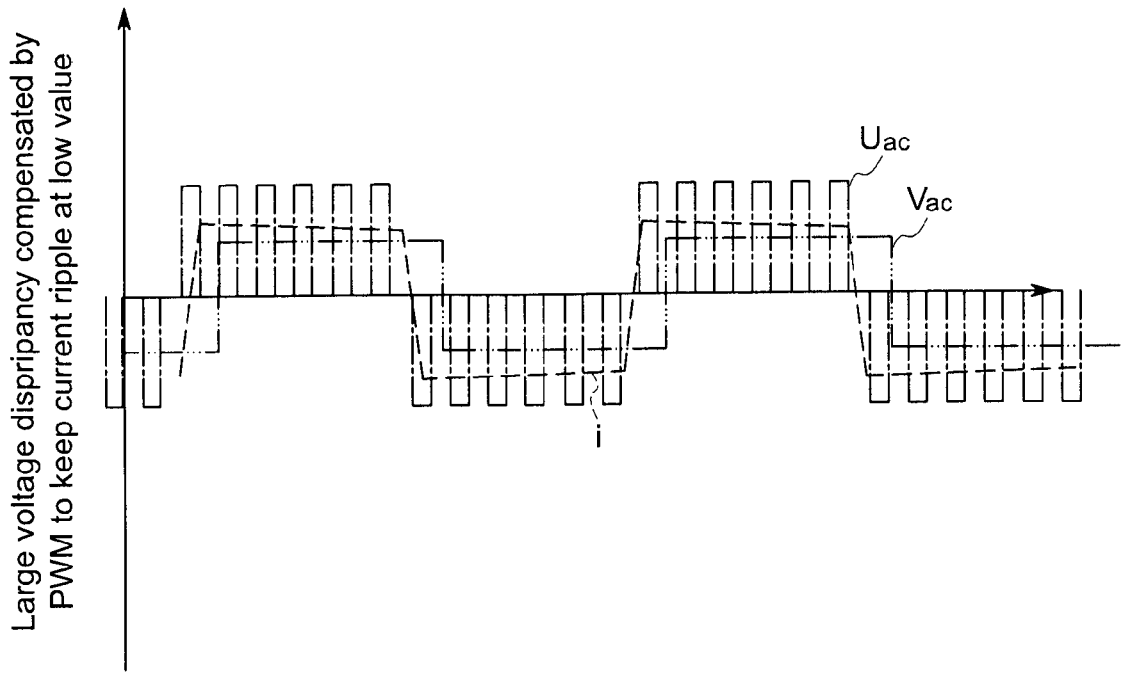
FIGS. 3A and 3B are curves showing the evolution of the voltages in the power conversion system.
Figure 3B:
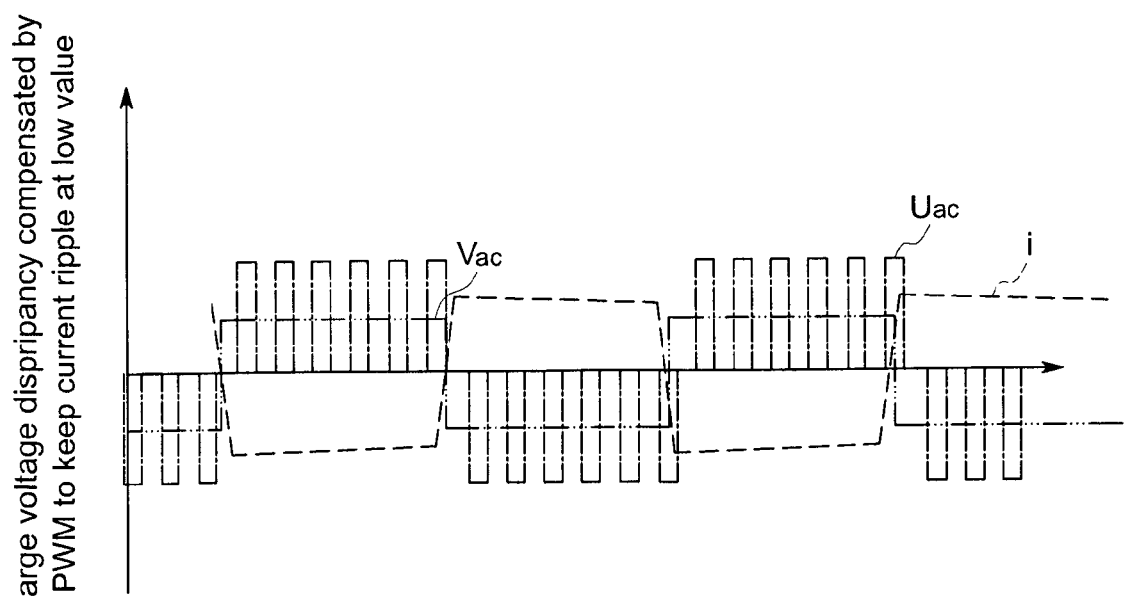
Figure 4:
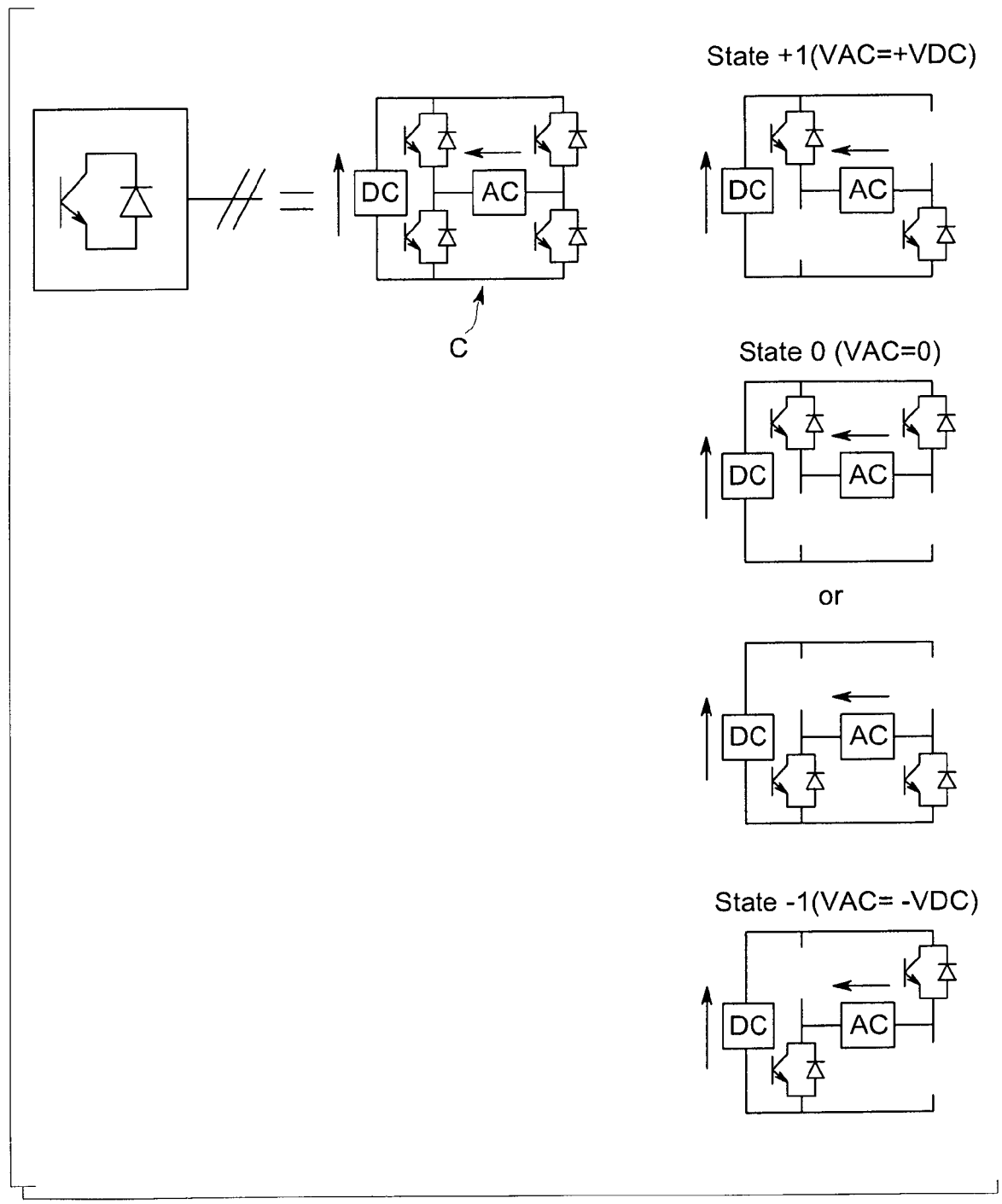
FIG. 4 illustrates the operation of a converter.

Refer first to the FIGS. 2 to 4 that illustrate the overall architecture and the operating principle of a power conversion system according to the invention, designated by the general reference number 1.

This system is intended to ensure the bidirectional transfer of power between a Udc bus supply bus delivering a unique continuous voltage supply and single-phase electric load.

It may for example involve ensuring a bidirectional transfer of power to an electric power storage system or from such a system based on consumption or electrical equipment needs.

Thus, the electric load 2 works either as a load, or as a generator when it comes to transfer power to the bus.

This system features a DC/AC power conversion stage 3. The voltage between the conversion stage terminals of the continuous side is noted Udc. On the alternating side, the voltage at the terminals of the conversion stage 3 is noted Uac. As seen, an inductance 4 is connected between the conversion stage 3 and the load 2. Such an inductance may be included of the inductance of a zigzag transformer or an inductance of the load itself. For example, for an alternating electric machine, the rated voltage Vac is the machine's internal voltage and the inductance 4 may be included of the machine's leak inductance.

The voltage Vac internal to the load, downstream of the inductance 4 internal to the load, is an alternating voltage in a square, rectangular or substantially rectangular cradle form, particularly trapezoidal. This is also the case for the Uac voltage.

The system thus provides an alternating output voltage Uac whose amplitude varies, for example between 10% and 100% of the voltage available on the Udc bus continuous bus, and a control voltage, whose fundamental component is out of phase with voltage Vac so that the power transfer is controlled according to the phase shift between voltage Uac in the converter and the load voltage Vac.

Thus, for example, with an energy storage or, on the contrary, a supply of energy from the load to the converter depending on whether the phase shift between the converter voltage and the load voltage is positive or negative.

However, the converter delivers a control voltage Uac in cradle form whose amplitude is controlled in order to avoid fluctuations in current i flowing in the power conversion system (FIGS. 3A and 3B) regardless of the output voltage.

The power conversion stage is especially controlled in order to deliver an output voltage Uac for which the average value of the amplitude of the cradle form corresponds to the amplitude of the load voltage Vac cradle forms, close to a transformation ratio, but whose instantaneous amplitude is determined so as to avoid these current fluctuations (FIGS. 3a and 3b).

The power conversion stage includes a set of converters intertwined through inductive circuits which will be described later in reference to FIGS. 7 to 9.

As shown in FIG. 4, each converter includes an inverter that has a set of switching cells such as C, including an H-bridge capable of delivering three voltage levels, according to the state of the switching cells, namely "state+1" (Uac=+Udc), "state 0" (Uac=0) and "state−1" (Uac=−Udc).

The switching cells are controlled using MLI modulation by pulse width.

Figure 5A:
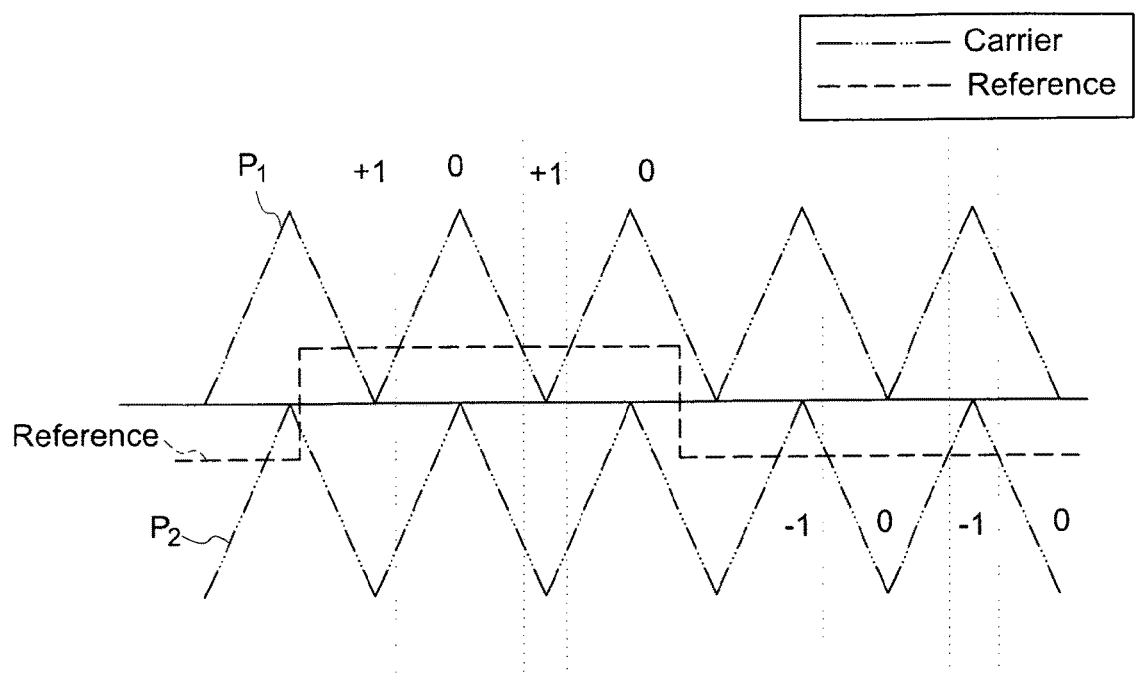
FIGS. 5A and 5B are curves showing the guidance of the converters.

For example, in reference to the FIG. 5A, each inverter receives from a control circuit a common reference voltage in Ref cradle form and two control signals P1 and P2 formed by sawtooth carriers that are offset from each other to get a voltage output having three levels.

The state of each switching cell passing or not is determined by the intersection between the reference signal and the two sawtooth carriers P1 and P2.

Figure 5B:
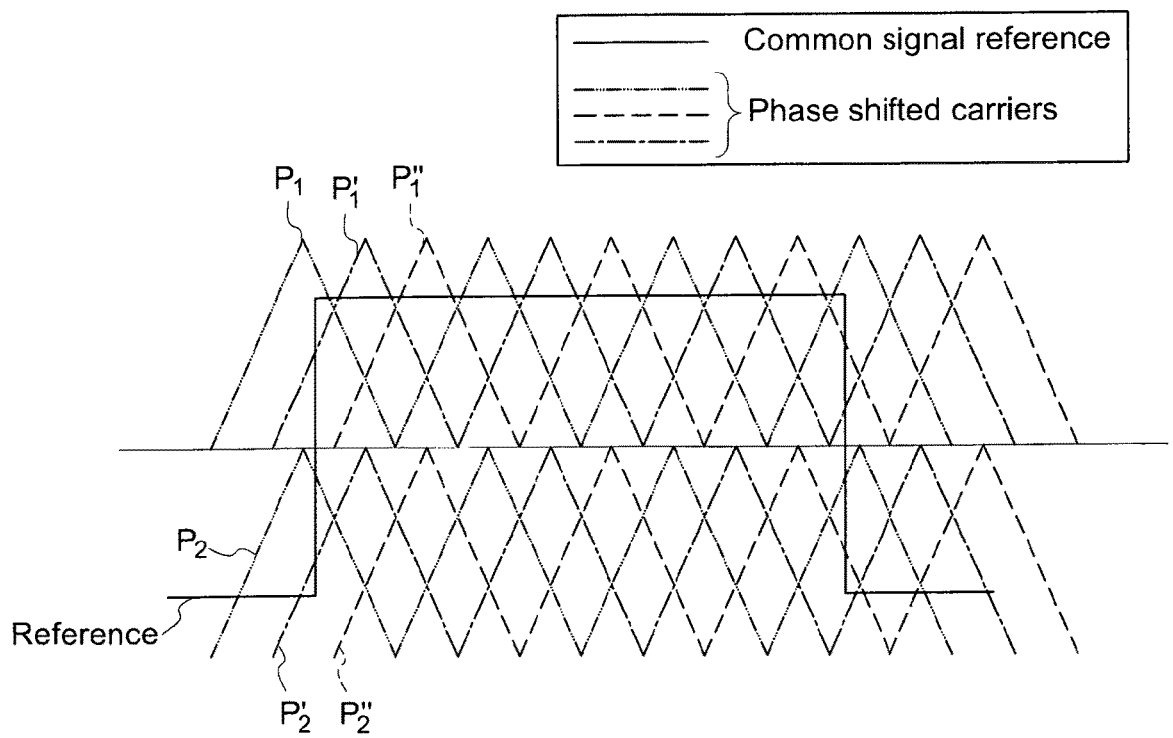

In reference to the FIG. 5B, for example, when using three converters, the power conversion stage receives the common reference voltage Ref and three pairs of sawtooth control signals P1, P2; P'1, P'2 and P''1 P''2. These sawtooth peaks P1 P1' and P1'', as well as the saw teeth P2 P2' P2'' are temporally out of phase in order to obtain the intertwining between the converters.

Figure 6:
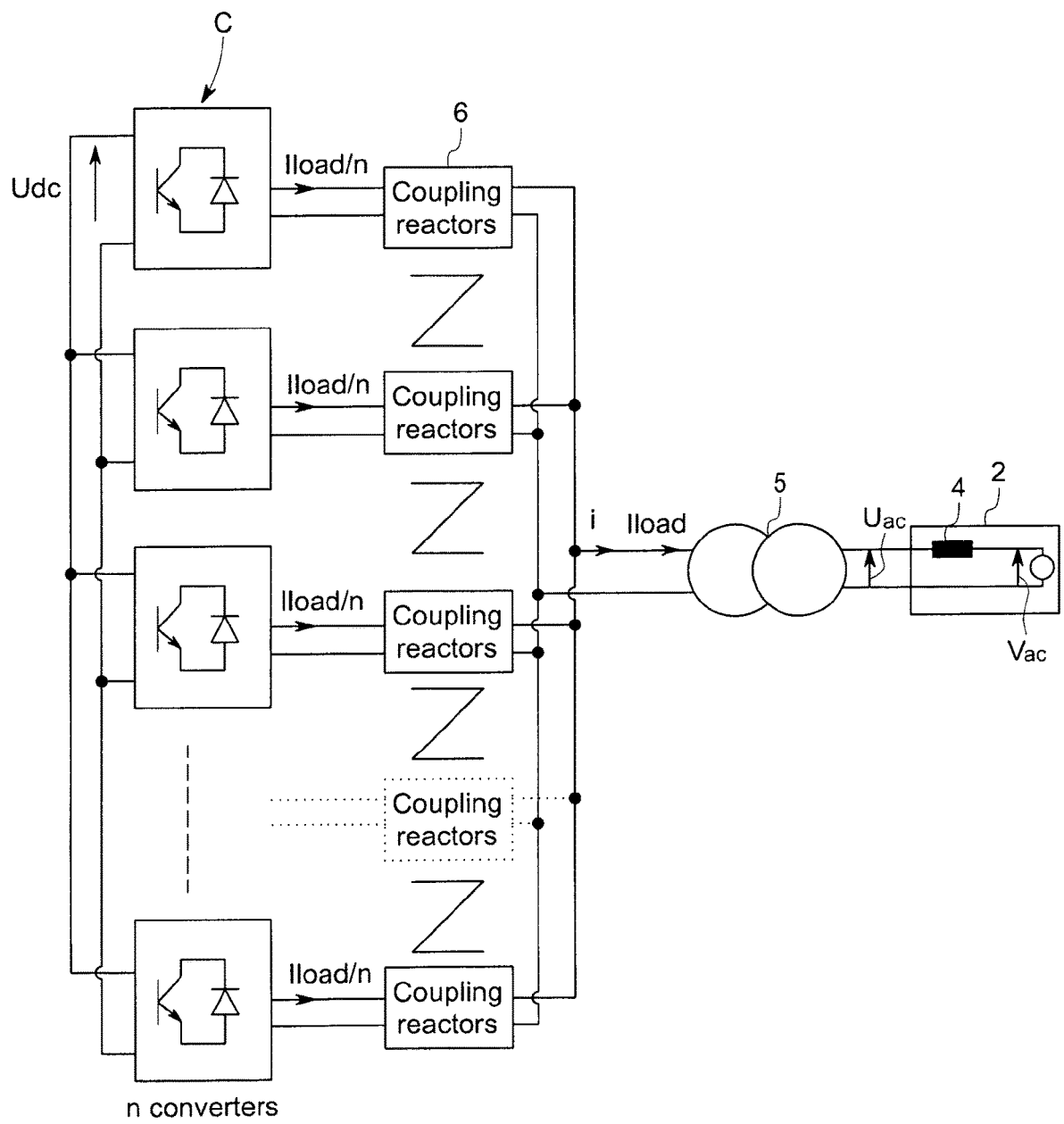
FIG. 6 is a detailed schematic of a power conversion system in accordance with the invention.

The output of each of the converters is interlaced by inductive circuits such as 4 (FIG. 6).

In an embodiment, a transformer 5 is interposed between load 2 and the output of the inductive circuits 4. Thus, the conversion stage output consists of the sum of the voltages provided by the converters divided by the number of converters, which allows smoothing the output voltage and reducing the current fluctuations.

In addition, the voltage regulation is faster than by a single converter.

Figure 7:
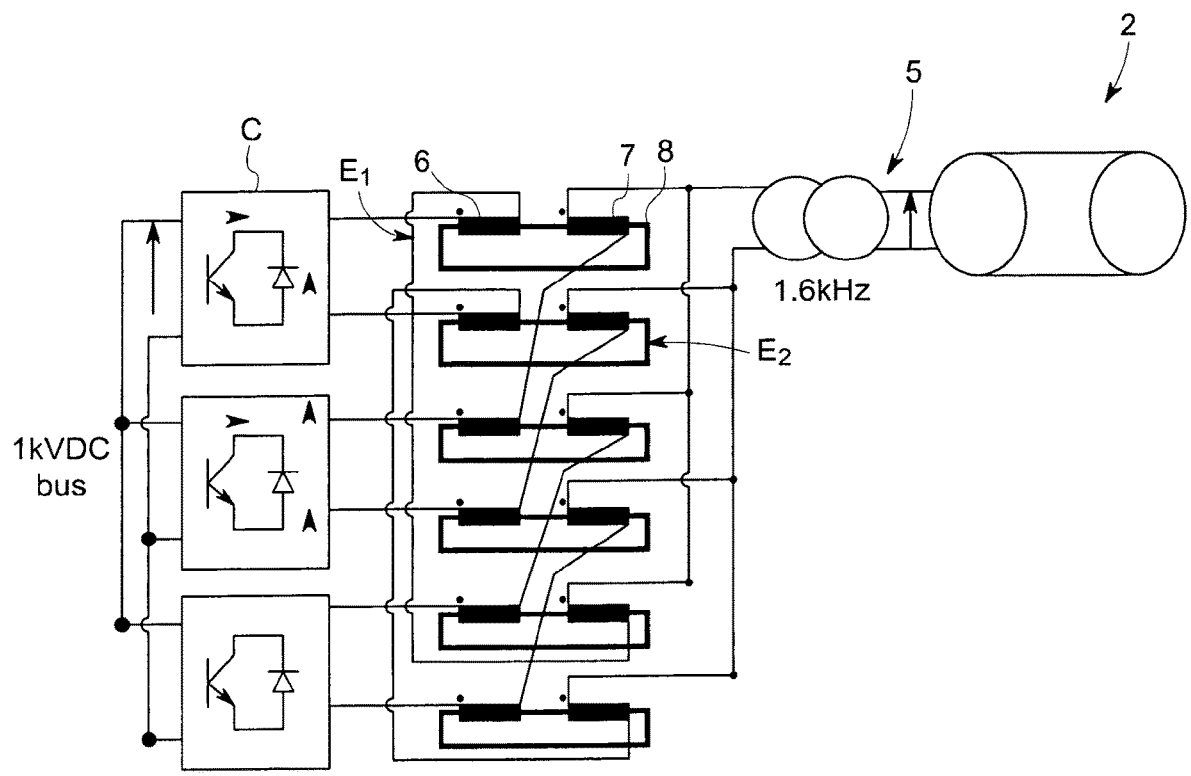
FIGS. 7, 8 and 9 show various converter coupling methods.
Figure 8:
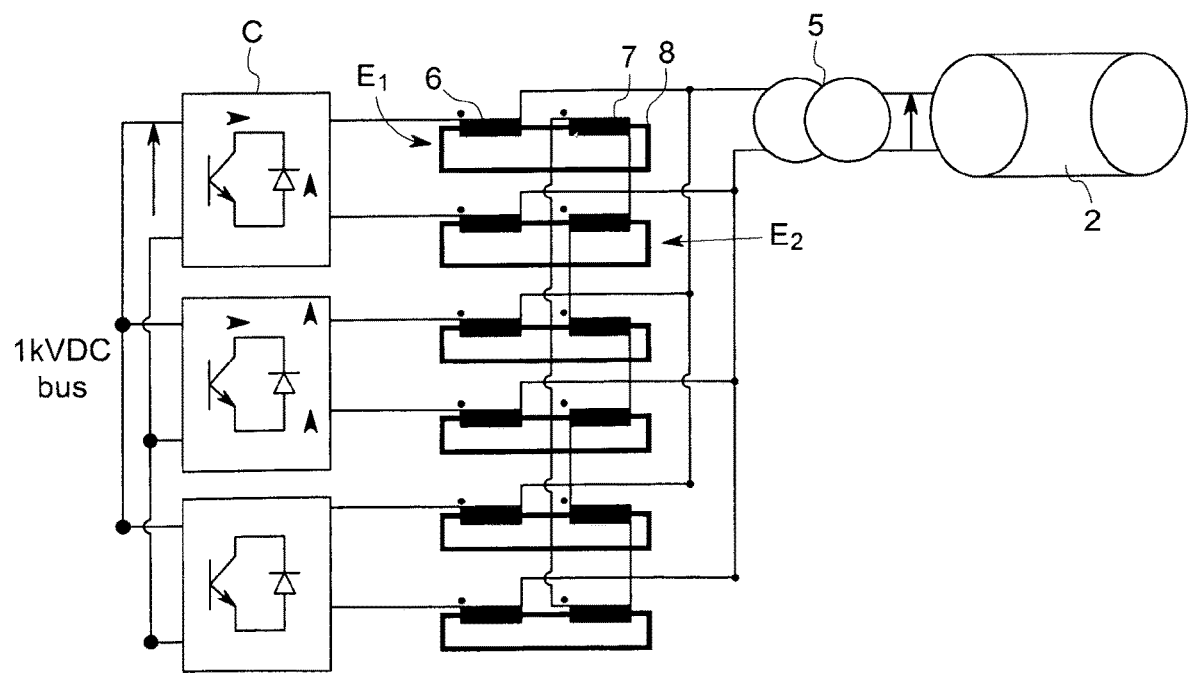
Figure 9:
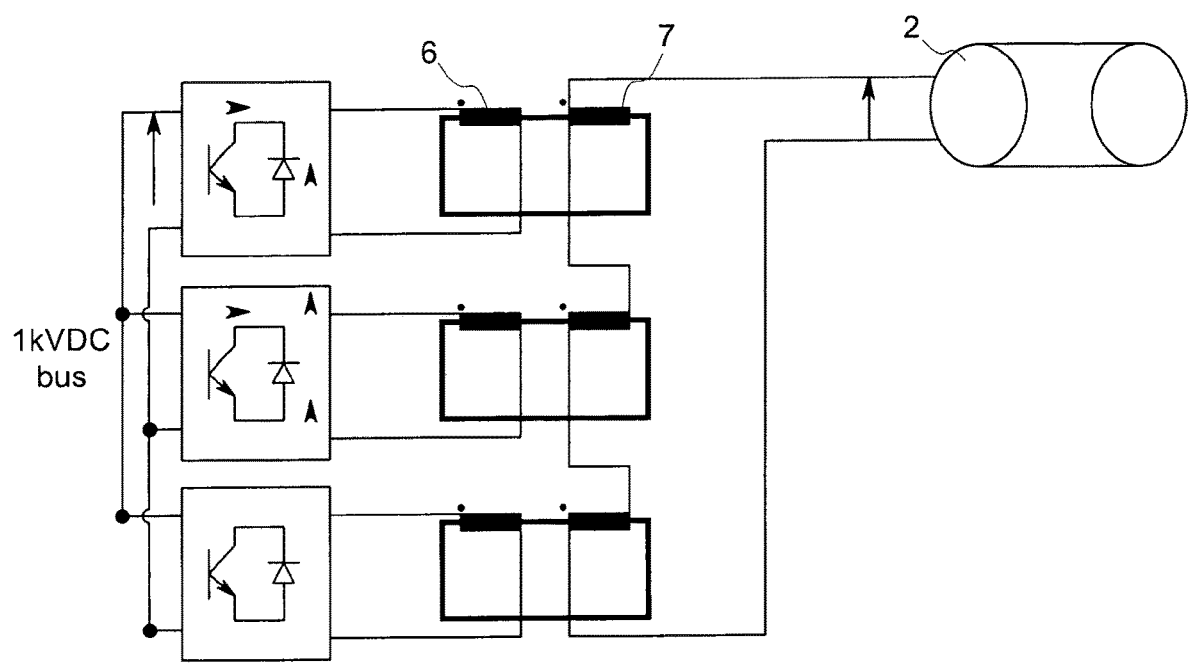

FIGS. 7 to 9 will be descrobed as a reference to various methods of coupling the converters 4.

As seen, the inductive circuits ensuring the intertwining of the output of the converters include two windings, such as 6 and 7 which are wound around a core 8. The first winding is connected to a converter k and the second winding is connected to a converter k+1 so that the flow generated by the windings are in opposite direction so that the flow generated by k+1 converter cancels the flow generated by converter k and so that the flow is canceled if the current delivered by the converter k+1 is equal to the current supplied by converter k. Thus, for the current output component, which is delivered to the load, the inductive circuits only oppose a low inductance value related to the leak inductances in the windings. If the currents generated by converters k and k+1 are different, then the flow is added. The result is a significant magnetizing inductance that will reduce the current variations, and especially the flow of current between the converters linked to the interlacing.

In the embodiment shown in FIG. 7, the converters are intertwined through inductive circuits including two sets of matched coils E1 and E2, corresponding respectively to two phases, so that the first coil 6 of the first and second sets E1 and E2 are connected to a converter and on the other hand to the second coil 7 of the first and second sets E1 and E2 of the first set of coils and that second coils 7 of inductive circuits are connected together and are also connected to the first coil of the first and second sets E1 and E2 of the first set of coils of another converter. The transformer 5 is connected here between the second coils of the first and second sets of coils.

According to a variation viewed in FIG. 8, the second coils 7 of the inductive circuits are connected in pairs and transformer 5 is connected between the common outputs between the first set of coils E1 on one hand, and the second set of coils E2 on the other hand.

In the embodiment example viewed in FIGS. 7 and 8, the coils in the first and second sets of coils are wrapped around separate cores.

It would also be possible, alternatively, to wrap them around a common core with a third column allowing free flow of the magnetic flow.

According to a third embodiment, visible in FIG. 9, the converters each have an inductive circuit comprising a first coil 6 and a second coil 7. The first coil 6 is connected to the output of the corresponding converter, while the other coils 7 are connected in pairs. In this embodiment, the load is directly connected to the inductive circuit and more particularly to the terminals of the two coils 7.

This embodiment is advantageous in that it allows to remove transformer 5 from the embodiments of FIGS. 7 and 8.

Figure 10:
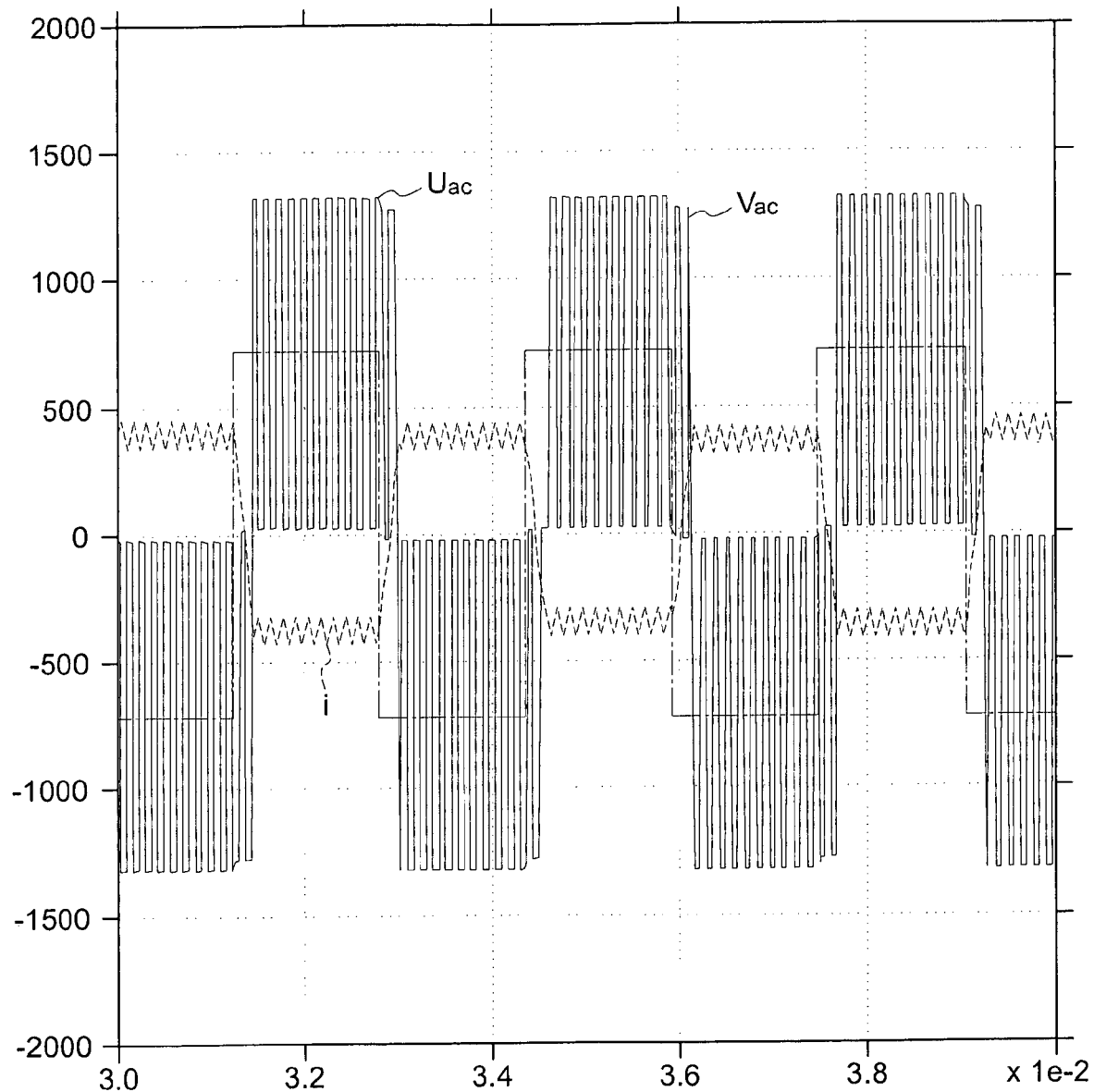
FIG. 10 shows the curves illustrating the evolution of the control and output voltages and the current flowing between the voltage converters and the load.

As shown in FIG. 10, the invention that was just described allows to avoid the appearance of significant fluctuations in current i flowing between the load and the conversion stage, with only residual undulations of negligible magnitude remaining.

The invention claimed is:

1. A bidirectional power conversion system, comprising:
a feeding bus configured to deliver a single continuous supply voltage and an alternating load output voltage substantially in a cradle form;
a power conversion stage connected to the feeding bus and comprising a set of interlaced converters configured to deliver a control voltage to the system;
an inductance located between the conversion stage and an electric load; and
an output voltage internal to the electric load and downstream of the inductance;
wherein, when a fundamental component of the control voltage is out of phase with the output voltage internal to the electric load, a phase shift between the alternating load output voltage and the output voltage internal to the electric load facilitates a controlled power transfer between the set of interlaced converters and the electric load; and
wherein, the power transfer is controlled in such a way that (i) an average value of an amplitude of the control voltage corresponds to an amplitude of the alternating output voltage and (ii) the control voltage includes amplitudes that reduce fluctuations of a current flowing between the voltage converters and the electric load.

2. The bidirectional power conversion system of claim 1, wherein each converter of the set of converters includes an H-bridge capable of delivering three voltage levels.

3. The bidirectional power conversion system of claim 1, further comprising a converter control circuit configured to deliver to each converter of the set of converters a common reference voltage in a cradle form corresponding to the alternating voltage output and a set of sawtooth out of phase control signals respectively destined to the converters.

4. The bidirectional power conversion system of claim 3, wherein each converter of the set of converters delivers an output voltage based on the reference voltage and a control signal.

5. The bidirectional power conversion system of claim 3, wherein the set of converters includes inductive circuits that connect each converter of the set converters together.

6. The bidirectional power conversion system of claim 5, wherein the inductive circuits include, for each converter, a first coil connected to the converters and a second coil connected to a second coil of an inductive circuit of a second converter, the load being directly connected to the inductive circuits.

7. The bidirectional power conversion system of claim 5, wherein the inductive circuits each include a set of paired coils.

8. The bidirectional power conversion system of claim 7, wherein the set of paired coils include a first coil connected to a first converter and a second coil connected to second converter.

9. The bidirectional power conversion system of claim 8, wherein the first and second coils are wrapped in a reverse direction around a magnetic core such that the magnetic fluxes generated by the coils cancel each other out when the converter currents are equal.

10. The bidirectional power conversion system of claim 8, wherein the inductive circuits include two sets of paired coils.

11. The bidirectional power conversion system of claim 10, wherein the two sets of paired coils each include a first coil connected to two converters and a second coil connected to a second coil of the set of paired coils connected to the set of converters.

12. The bidirectional power conversion system of claim 10, wherein an output transformer is connected to the second coil of each of the two sets of paired coils to raise the alternating voltage.

13. The bidirectional power conversion system of claim 8, wherein the inductive circuits include, for each converter, two sets of paired coils.

14. The bidirectional power conversion system of claim 13, further comprising an output transformer being connected to the first coil of the first and second sets of coils to provide said alternating voltage.

15. The bidirectional power conversion system of claim 13, wherein each paired coil of the two sets of paired coils includes a first coil connected to the set of converters, and wherein the second coils are connected in pairs.

16. The bidirectional power conversion system of claim 15, wherein the two sets of paired coils are wound on separate cores.

17. The bidirectional power conversion system of claim 15, wherein the two sets of paired coils are coiled on a common core with a third free flow column.

* * * * *